(12) United States Patent
Ruxton (10) Patent No.: US 10,626,986 B2
(45) Date of Patent: Apr. 21, 2020

(54) HYDRAULIC MOTOR DRIVE SYSTEM FOR CONTROLLING HIGH INERTIAL LOAD ROTARY COMPONENTS

(71) Applicant: HydraForce, Inc., Lincolnshire, IL (US)

(72) Inventor: David Ruxton, Lakemoor, IL (US)

(73) Assignee: HydraForce, Inc., Lincolnshire, IL (US)

( * ) Notice: Subject to any disclaimer, the term of this patent is extended or adjusted under 35 U.S.C. 154(b) by 29 days.

(21) Appl. No.: 15/797,893

(22) Filed: Oct. 30, 2017

(65) Prior Publication Data

US 2018/0119809 A1    May 3, 2018

Related U.S. Application Data

(60) Provisional application No. 62/415,162, filed on Oct. 31, 2016.

(51) Int. Cl.

| | | |
|---|---|---|
| *F16H 61/47* | (2010.01) | |
| *F16H 61/4008* | (2010.01) | |
| *F16H 61/4183* | (2010.01) | |
| *A01D 69/03* | (2006.01) | |
| *F16H 61/431* | (2010.01) | |
| *A01D 57/02* | (2006.01) | |
| *F16H 61/4061* | (2010.01) | |

(52) U.S. Cl.
CPC .............. *F16H 61/47* (2013.01); *A01D 69/03* (2013.01); *F16H 61/4008* (2013.01); *F16H 61/4183* (2013.01); *A01D 57/02* (2013.01); *F16H 61/4061* (2013.01); *F16H 61/431* (2013.01)

(58) Field of Classification Search
CPC .. F15B 11/042; F15B 11/0423; F16H 61/431; F16H 61/47
See application file for complete search history.

(56) References Cited

U.S. PATENT DOCUMENTS

| | | | | |
|---|---|---|---|---|
| 3,067,693 | A * | 12/1962 | Lambeck | F04B 49/128 137/486 |
| 3,820,920 | A * | 6/1974 | Klimaszewski et al. | F04B 49/08 417/213 |
| 3,865,514 | A * | 2/1975 | Lonnemo | F04B 49/02 417/212 |
| 4,067,664 | A * | 1/1978 | Robeller | F04B 49/08 417/218 |
| 4,627,239 | A * | 12/1986 | Nishimune | B66D 1/50 60/428 |

(Continued)

FOREIGN PATENT DOCUMENTS

| | | | | |
|---|---|---|---|---|
| DE | 10031982 A1 * | 1/2002 | ......... | B60R 16/0373 |
| DE | 102014004932 B3 * | 5/2015 | ........... | E01C 19/201 |
| WO | WO-2013128622 A1 * | 9/2013 | .............. | F04B 49/24 |

*Primary Examiner* — Thomas E Lazo
*Assistant Examiner* — Matthew Wiblin
(74) *Attorney, Agent, or Firm* — Leydig, Voit & Mayer, Ltd.

(57) ABSTRACT

A hydraulic motor drive system controls the pressure of the hydraulic fluid delivered to a motor by a variable pressure source to control the rotation of a high inertial load rotary member driven by the motor. The speed of the motor and/or rotary component is monitored and changes in the speed are controlled by changing the pressure of the hydraulic fluid delivered to the motor.

26 Claims, 4 Drawing Sheets

(56) References Cited

U.S. PATENT DOCUMENTS

| | | | |
|---|---|---|---|
| 2007/0012013 A1* | 1/2007 | Strosser | A01D 34/40 56/10.2 R |
| 2011/0239605 A1* | 10/2011 | Remillard | A01D 57/02 56/10.2 R |
| 2013/0035828 A1* | 2/2013 | Tamura | B60P 1/162 701/50 |
| 2013/0323091 A1* | 12/2013 | Helbling | F04B 49/035 417/307 |
| 2013/0332036 A1* | 12/2013 | Yamamoto | E02F 9/123 701/50 |
| 2014/0208728 A1* | 7/2014 | Ma | F15B 21/14 60/327 |
| 2015/0159682 A1* | 6/2015 | Bae | F15B 11/0423 60/445 |
| 2016/0245149 A1* | 8/2016 | Johnson | F01P 7/044 |

* cited by examiner

HYDRAULIC MOTOR DRIVE SYSTEM FOR CONTROLLING HIGH INERTIAL LOAD ROTARY COMPONENTS

CROSS-REFERENCE TO RELATED APPLICATIONS

This patent application claims the benefit of priority to U.S. Provisional Patent Application No. 62/415,162, filed Oct. 31, 2016, and entitled, "Hydraulic Control System For Controlling High Inertial Load Components," which is incorporated in its entirety herein by this reference.

TECHNICAL FIELD

This patent disclosure relates generally to a hydraulic drive system and, more particularly, to a hydraulic motor drive system for controlling the rotational speed of a high inertial load rotary member to reduce oscillations during rotation of the rotary member.

BACKGROUND

Hydraulic systems are often used to drive motors operatively connected to high inertial load rotary components. Maintaining a relatively constant rotational speed is desirable but often problematic due to a variety of factors including imbalances within the rotary components and tolerances between drive components.

Attempts have been made to maintain a constant rotational speed by controlling the flow rate of the hydraulic fluid used to power the hydraulic motor of a system. In some instances, such flow rate control has proven unsuccessful, resulting in inconsistent or unstable rotational operation and pressure spikes caused in part by the high inertial load. The inconsistent or unstable rotational operation often results in a repeating pattern in which the rotating component speeds up and slows down. Such repeating pattern is sometimes referred to as "loping," and the frequency of the loping can be dependent on the rotational rate of the rotary component.

An example of rotary component having a high inertial load is a reel of a combine harvester. The reel assists in moving harvested material from one location to another within the material processing chain or path of the combine. As the reel contacts crops and/or the ground during the harvesting process, the reel typically encounters inconsistent or non-uniform loads which can further cause inconsistent rotation or loping of the reel. When harvesting some crops, inconsistent rotation or loping of the reel may result in the harvested material being misdirected out of the material processing path or damage to the material. In either case, the loping of the reel reduces the output of the harvesting process and thus the process efficiency.

It will be appreciated that this background description has been created by the inventor to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a hydraulic control system configured to maintain a relatively constant rotational speed of a high inertial load rotary component by controlling the pressure at the input of a hydraulic motor driving the rotary component. In addition, the present disclosure, in another aspect, is directed to embodiments of a method of operating a hydraulic motor coupled to a rotary component with a high inertial load in which the pressure of working fluid through the hydraulic motor is controlled to reduce oscillations during the rotation of the rotary component. Embodiments of such solution can reduce the complexity and cost of the hydraulic control system while providing improved performance compared to existing solutions.

In one embodiment, a hydraulic motor drive system includes a tank, a variable pressure hydraulic fluid pressure source, a motor, a rotatable member, a sensor, and a controller.

The tank is adapted to hold a reservoir of hydraulic fluid and the variable pressure hydraulic fluid source is in fluid communication with the tank. The fluid source is adapted to receive a supply of hydraulic fluid from the tank and to discharge a flow of hydraulic fluid.

The motor is fluidly connected to the variable pressure hydraulic fluid source to be rotationally driven thereby and the rotatable member is arranged with the motor to be rotationally driven thereby.

The sensor is operatively associated with at least one of the motor and the rotatable member. The sensor is adapted to sense a rotational speed and to generate a speed signal indicative of the rotational speed of at least one of the motor and the rotatable member sensed by the sensor.

The controller is in operable communication with the sensor to receive the speed signal therefrom and with the variable pressure hydraulic fluid source. The controller is configured to determine an actual rotational speed of the at least one of the motor and the driven member based upon the speed signal received from the sensor and compare the actual rotational speed to a desired rotational speed. The controller is further configured to, if the actual rotational speed is greater than the desired rotational speed, send a control signal to the variable pressure fluid source to reduce the pressure supplied by the variable pressure fluid source.

In another embodiment, a method of operating a hydraulic motor drive system comprises rotating a rotatable member by directing a flow of hydraulic fluid from a variable pressure hydraulic fluid source to a motor operably connected to the rotatable member and sensing an actual rotational speed of at least one of the motor and the rotatable member using a sensor.

The method further includes comparing the actual rotational speed to a desired rotational speed and, if the actual rotational speed is greater than the desired rotational speed, reducing a pressure supplied by the hydraulic fluid source to reduce the actual rotational speed of the at least one of the motor and the rotatable member.

Further and alternative aspects and features of the disclosed principles will be appreciated from the following detailed description and the accompanying drawings. As will be appreciated, the hydraulic valves, hydraulic circuits, and methods for controlling hydraulic fluid disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

Embodiments of a hydraulic control system constructed in accordance with principles of the present disclosure are adapted to control the operation of rotational components having a high inertial load, such as, a harvester reel, for example. Embodiments of a hydraulic control system constructed in accordance with principles of the present disclosure can provide improved functionality as compared to conventional circuits.

Embodiments of a hydraulic control system constructed in accordance with principles of the present disclosure can help improve the operation of a rotational component having a high inertial load with a relatively small number of flow control components. In addition, embodiments of a hydraulic control system constructed in accordance with principles of the present disclosure can help improve the stability or consistency of the rotation of the rotary component.

Figure 1:
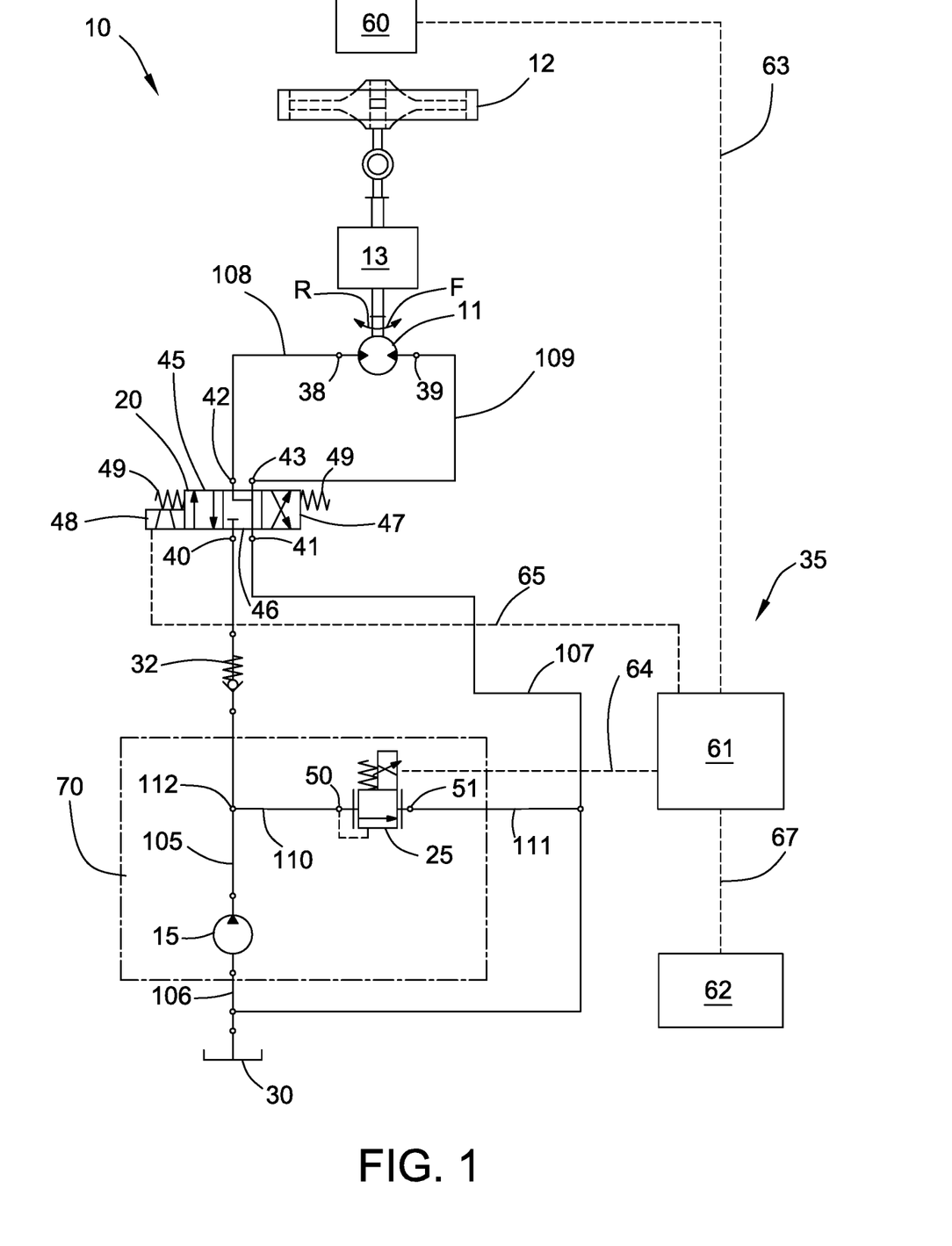
FIG. 1 is a schematic view of an embodiment of a hydraulic circuit in accordance with principles of the present disclosure, the hydraulic circuit including a variable pressure source.

Turning now to the Figures, an embodiment of a hydraulic control system 10 constructed according to principles of the present disclosure is shown in FIG. 1. In embodiments, the hydraulic motor drive system 10 can be used to operate a driven member or rotational component, such as, a motor 11 operatively connected to a rotatable member such as a high inertial load rotary component 12. The hydraulic motor drive system 10 comprises a pump 15, a directional control valve 20, a pressure control valve 25, a tank 30, and a closed-loop control system 35.

In embodiments, the motor 11 can be any suitable motor that is acceptable for the intended purpose, as will be readily understood by one skilled in the art. In embodiments, the motor 11 can be a fixed-displacement motor. In embodiments, the motor 11 can be operatively connected to the component 12 by a transmission or gearbox 13. The illustrated motor 11 includes a first port 38 and a second port 39.

In an embodiment, the high inertial load rotary component 12 can be a combine or harvester reel that is rotationally driven by the motor 11. In embodiments, the high inertial load rotary component 12 can have a moment of inertia of at least 10 kg m². In some embodiments, the high inertial load rotary component 12 can have a moment of inertia of at least 100 kg m². In some embodiments, the high inertial load rotary component 12 can have a moment of inertia of at least 200 kg m².

In embodiments, the pump 15 can be any suitable pump that is acceptable for the intended application, as will be readily understood by one skilled in the art. In embodiments, the pump 15 can be a fixed-displacement pump. The pump 15 is in fluid communication with the directional control valve 20 via a valve supply line 105 and is in fluid communication with the tank 30 via a tank line 106. In embodiments, the pump 15 can be in fluid communication with the tank 30 via any suitable technique.

The directional control valve 20 is interposed between, and in selective fluid communication with, the check valve 32 and the motor 11 and the motor 11 and the tank 30. The directional control valve 20 is adapted to selectively direct the flow of hydraulic fluid from the pump 15 through the directional control valve 20 to the motor 11 and return a flow of hydraulic fluid from the motor 11 to the tank 30.

In embodiments, the directional control valve 20 can be any suitable directional control valve that is acceptable for the intended purpose, as will be readily understood by one skilled in the art. In embodiments, the directional control valve 20 is adapted to control the direction of the flow of the hydraulic fluid from the pump 15 to the motor 11 to provide the desired direction of rotational of the motor 11 and the component 12. In the illustrated embodiment, the directional control valve 20 comprises a spool-type directional control valve. In embodiments, the directional control valve 20 can be actuated in any desired manner. In the illustrated embodiment, the directional control valve 20 is electro-mechanically actuated.

The illustrated directional control valve 20 includes an inlet port 40, a tank outlet port 41, a first work port 42, and a second work port 43. The inlet port 40 of the directional control valve 20 is in fluid communication with the pump 15 via the valve supply line 105. The tank outlet port 41 is in fluid communication with the tank 30 via a valve return line 107. The first work port 42 is in fluid communication with the first port 38 of the motor 11 via a first motor line 108. The second work port 43 is in fluid communication with the second port 39 of the motor 11 via a second motor line 109.

In the illustrated embodiment, the directional control valve 20 is movable between a forward position 45, a neutral position 46, and a reverse position 47. A solenoid assembly 48 can be adapted to selectively move the directional control valve 20 over a range of travel between the forward position 45, the neutral position 46, and the reverse position 47. In embodiments, the directional control valve 20 can include one or more biasing members 49, such as a spring, for example, to bias the directional control valve 20 to the neutral position 46.

In the neutral position 46, as shown in FIG. 1, the pump 15 is fluidly isolated from the first work port 42 and the second work port 43 of the directional control valve 20, and both work ports 42, 43 are in fluid communication with the tank 30 via the valve return line 107 and through the neutral position 46 of the directional control valve 20 to allow hydraulic fluid to drain from the motor 11. When the directional control valve 20 is in the neutral position 46, the motor 11 does not receive a flow of hydraulic fluid from the pump 15.

In the forward position 45, the pump 15 is in fluid communication with the first work port 42 of the directional control valve 20 via the valve supply line 105 and through the forward position 45 of the directional control valve, and the tank 30 is in fluid communication with the second work port 43 of the directional control valve 20 via the valve return line 107 and through the forward position 45 of the directional control valve. An output shaft of the motor 11, in response to the flow of hydraulic fluid from the pump 15 moving from the first motor port 38 through the hydraulic motor 11 out the second motor port 39, is rotatable in the forward direction F when the directional control valve 20 is in the forward position 45.

In the reverse position 47, the pump 15 is in fluid communication with the second work port 43 of the directional control valve 20 via the valve supply line 105 and through the reverse portion 47 of the directional control valve 20, and the tank 30 is in fluid communication with the first work port 42 of the directional control valve via the valve return line 107 and through the reverse position 47 of the directional control valve 20. The output shaft of the motor 11, in response to the flow of hydraulic fluid from the pump 15 moving from the second motor port 39 through the hydraulic motor 11 out the first motor port 38, is rotatable in the reverse direction R when the directional control valve 20 is in the reverse position 47. The reverse direction R is in opposing relationship to the forward direction F.

In the illustrated embodiment, the pressure control valve 25 is positioned in parallel to the motor 11 via the directional control valve 20 and is in fluid communication with both the valve supply line 105 and the valve return line 107. The pressure control valve 25 is in fluid communication with the pump 15 and the tank 30. The pressure control valve 25 is adapted such that a pressurized flow of hydraulic fluid from the pump 15 that exceeds a pressure threshold is diverted away from the directional control valve 20 through the pressure control valve 25 and to the tank 30. In embodiments, the pressure control valve 25 is adapted to be used for system pressure stability to help decrease the incidence and/or magnitude of loping (or cyclical rotational speed variations or oscillations) when the motor 11 is being used to rotate the component 12.

In embodiments, the pressure control valve 25 can be any suitable pressure control valve that is acceptable for its intended purpose, as will be readily understood by one skilled in the art. In embodiments, the pressure control valve 25 is adapted to control the pressure of the hydraulic fluid delivered to the motor 11, either at the first motor port 38 of the motor 11 (within the first motor line 108) when the directional control valve 20 is in the forward position 45 or at the second motor port 39 (within the second motor line 109) when the directional control valve 20 is in the reverse position 47.

The pressure control valve 25 includes an inlet port 50 and an outlet port 51. A supply side conduit 110 extends between the inlet port 50 of the pressure control valve 25 and the valve supply line 105. A return side conduit 111 extends between the outlet port 51 of the pressure control valve 25 and the valve return line 107. The valve supply line 105 may be in fluid communication with the return supply line 107 via the supply side conduit 110, through the pressure control valve 25, and through the return side conduit 111. Thus, when hydraulic fluid is flowing through the pressure control valve 25, the supply side conduit 110, the pressure control valve 25, and the return side conduit 111 create, in sequence, a parallel fluid connection between the supply line 105 and the return line 107.

In embodiments, the pressure control valve 25 can be an electro-proportional pressure control valve that controls the pressure drop between the valve supply line 105 and the valve return line 107 based upon the amount of current provided to the electro-magnetic actuator (e.g., a solenoid assembly) of the pressure control valve 25. The pressure control valve 25 is configured to open and permit flow to pass therethrough upon the pressure between the inlet port 50 and the outlet port 51 of the valve being greater than a predetermined threshold. Through the use of an electro-proportional control, the threshold pressure can be adjusted by changing the electrical control signal supplied to the electro-magnetic actuator of the control valve 25. In embodiments, the pressure control valve 25 can be controlled by any suitable control mechanism that is acceptable for its intended purpose, as will be readily understood by one skilled in the art. For example, pressure control valve 25 can be controlled by a stepper motor, servo mechanism, mechanical feedback, or any other type of control.

In the illustrated embodiment of FIG. 1, when the threshold pressure is exceeded, hydraulic fluid flows from the valve supply line 105 through the supply side conduit 110 and enters the pressure control valve 25 through the inlet port 50. Hydraulic fluid flows out of the pressure control valve 25 through the outlet port 51 and into the return side conduit 111 and returns to the tank 30 via the valve return line 107. As may be understood, by adjusting the threshold pressure of the pressure control valve 25, the pressure of the hydraulic fluid delivered to the motor 11 via the directional control valve 20 can be controlled.

In embodiments, the tank 30 comprises a reservoir of hydraulic fluid which can be drawn into the pump 15 through tank line 106 in order to generate a flow of hydraulic fluid for the system 10. In embodiments, the tank 30 can be any suitable tank known to those skilled in the art.

In embodiments, the closed-loop control system 35 includes a sensor 60, a controller 61, and an operator input device 62. In embodiments, the sensor 60 can be any suitable sensor that is acceptable for its intended application, as will be readily understood by one skilled in the art. In embodiments, the sensor 60 can be operatively associated with the motor 11 or the high inertial load rotary component 12 in order to monitor the rotational speed of the rotary component. In embodiments, the sensor 60 can be a Hall effect sensor that operates to generate a speed signal indicative of the rotational speed of the motor 11 or the high inertial load rotary component 12. In embodiments, elements of the sensor 60 can be mounted on the motor 11, the high inertial load rotary component 12 or other components indicative of the rotational speed of the rotary component.

In embodiments, the controller 61 can be any suitable controller that is acceptable for the intended application, as will be readily understood by one skilled in the art. In embodiments, the controller 61 can be an electronic controller that operates in a logical fashion to perform operations, execute control algorithms, store and retrieve data and other desired operations. The controller 61 can include or access memory, secondary storage devices, processors, and any other components for running an application. The memory and secondary storage devices can be in the form of read-only memory (ROM), random access memory (RAM) or integrated circuitry that is accessible by the controller. Various other circuits can be associated with the controller 61 such as power supply circuitry, signal conditioning circuitry, driver circuitry, and other types of circuitry. The functionality of the controller 61 can be implemented in hardware and/or software without regard to the functionality.

In embodiments, the controller 61 can receive signals from the sensor 60 via a wired or wireless connection as depicted at 63. In embodiments, the controller 61 can provide signals, via a wired or wireless connection as depicted at 64, to the pressure control valve 25 to adjust the threshold pressure of the pressure control valve. In embodiments, the controller 61 can provide signals, via a wired or wireless connection as depicted at 65, to the directional control valve 20 to selectively move the directional control valve 20 from the neutral position 46 over the range of travel between the forward position 45 and the reverse position 47.

In embodiments, the operator input device 62 can be any suitable input device that is acceptable for the intended application, as will be readily understood by one skilled in the art. In embodiments, the operator input device 62 can be any type of device in which the rotational speed of the high inertial load rotary component 12 can be set. In one example, the operator input device 62 can embody a rotary or linear input device. In embodiments, the controller 61 can receive signals from the operator input device 62 via a wired or wireless connection as depicted at 66.

During or prior to operation, an operator can set a desired rotational speed for the high inertial load rotary component 12 (or motor 11) via the operator input device 62. In doing so, the desired rotational speed can be stored within the controller 61. In some embodiments, setting a desired rotational speed can also include setting an acceptable range within which the rotational speed may vary. In some embodiments, an operator or other personnel can set or store a first desired rotational speed and/or a second desired rotational speed. The rotational speeds between the first and second desired rotational speeds can define a range of acceptable rotational speeds. In another embodiment, a rotational speed variation range can be set or stored by an operator or other personnel. The rotational speed variation range can be used with a desired rotational speed to define a range of acceptable rotational speeds.

The operator can also set the position of the directional control valve 20 in either the forward position 45 or the reverse position 47. With the directional control valve 20 in the forward position 45, the pump 15 directs hydraulic fluid via the valve supply line 105, through the forward position 45 of the directional control valve, and into the first motor line 108 so that hydraulic fluid enters the first port 38 of the motor 11 to rotate the output shaft of the motor 11 in the forward direction F to correspondingly rotate the high inertial load rotary component 12 operatively connected to the motor 11 in a first direction. After driving the rotation of the motor 11, the hydraulic fluid exits the motor 11 is returned to the tank 30 by passing from the second port 39, through the second motor line 109, through the forward position 45 of directional control valve 20, and through the valve return line 107.

A signal from the sensor 60 indicative of the rotational speed of the component 12 is received by the controller 61 and the actual rotational speed of the component 12 determined. If the actual rotational speed of the component 12 is less than the desired rotational speed set by the operator, the controller 61 generates a control signal to adjust the pressure control valve 25 to increase the threshold pressure required before the pressure control valve 25 diverts hydraulic fluid through it to the tank 30. An increase in the threshold pressure results in an increase in pressure before opening the pressure control valve 25 and thus results in an increase in pressure at the input or first port 38 of the motor 11. Conversely, if the actual rotational speed of the component 12 is greater than the desired rotational speed set by the operator, the controller 61 generates a control signal to adjust the pressure control valve 25 to decrease the threshold pressure required to permit the pressure control valve 25 to divert hydraulic fluid through it to the tank 30. A decrease in the threshold pressure results in a reduction or decrease in pressure before opening the pressure control valve 25 and thus results in a decrease in pressure at the input or first port 38 of the motor 11. Through such a configuration, the controller 61 can thus automatically adjust the threshold pressure of the pressure control valve 25 and thus also control the pressure at the first port 38 of the motor 11.

More, specifically, in embodiments, the controller 61 can compare the actual rotational speed to the desired rotational speed. If the actual rotational speed is greater than the desired rotational speed, the controller 61 can generate a control signal to reduce the pressure supplied by the variable pressure source 70 and thus reduce the pressure of the hydraulic fluid delivered to the first port 38 (i.e., inlet port when operating in the forward direction) of the motor 11. If the actual rotational speed is less than the desired rotational speed, the controller 61 can generate control a signal to increase the pressure supplied by the variable pressure source 70 and thus reduce the pressure of the hydraulic fluid delivered to the first port 38 (i.e., inlet port when operating in the forward direction) of the motor 11.

In embodiments, a range of desired rotational speeds can be set or stored by or within controller 61. In an embodiment, a first desired rotational speed representing an upper limit of rotational speed may be set or stored. In an embodiment, a second desired rotational speed representing a lower limit of rotational speed may be set or stored. In an embodiment, both first and second desired rotational speeds representing upper and lower limits of rotational speed may be set or stored. In an embodiment, a desired rotational speed together with a rotational speed variation range relative to the desired rotational speed may be set or stored.

By setting or storing an acceptable range of rotational speeds, no change in the supplied pressure will made while the actual rotational speed is within the acceptable range. If the actual rotational speed is outside of the range, changes in the supplied pressure are made by the controller 61 to change the actual rotational speed so that it is within the acceptable range. Such a configuration can reduce the number of changes made by the controller 61 during the operation of the system 10.

By controlling the pressure of the hydraulic fluid delivered to the motor 11, the rotational speed of the motor, and thus the component 12 operatively connected thereto, can be adjusted so that the component 12 rotates at the desired speed. By controlling the speed of the motor 11 through control of the pressure at the inlet 38 of the motor, the rotation of the output shaft of the motor 11 will be relatively constant with reduced occurrences of loping or oscillations of the rotary component 12.

In embodiments, the hydraulic motor drive system 10 can be used to drive a rotary component 12 having a large moment of inertia and with the rotary component being subjected to a relatively constant load. In some embodiments, the rotary component 12 can be subjected to a relatively low frictional load. In embodiments, the frictional load can make up or comprise less than seventy-five percent of the total load on the rotary component 12.

Operation of the hydraulic control system 10 with the directional control valve 20 in the reverse position 47 is similar to the operation described above but with the hydraulic fluid flowing in an opposite direction.

In embodiments, it may be desirable to position a valve along the valve supply line 105 or the valve return line 107 to further control the operation of hydraulic control system 10. In embodiments, the valve can be any suitable pressure control valve that is acceptable for the intended purpose, as will be readily understood by one skilled in the art. In the illustrated embodiment, a check valve 32 is positioned along the valve supply line 105 at a location between the directional control valve 20 and the intersection 112 of the valve supply line 105 with the supply side conduit 110.

In the illustrated embodiment, the check valve 32 operates to prevent flow of hydraulic fluid through the valve supply line 105 if the pressure in the supply line is less than a predetermined threshold. In one example, the check valve 32 can be configured so that the threshold pressure associated with the check valve is 100 psi. In such case, no hydraulic fluid will flow through the valve supply line 105, and thus hydraulic fluid will not reach the motor 11, until the pressure of the fluid in the valve supply line 105 exceeds 100 psi. A different threshold pressure can be used in other embodiments. In some instances, the check valve 32 can be used to create a minimum pressure requirement or bias so that the pressure control valve 25 operates within a desired pressure range. For example, some pressure control valves may experience optimal performance above a specific pressure. In such case, it may be desirable to provide a check valve with a threshold pressure at or above the optimal performance pressure of the pressure control valve.

The fixed displacement pump 15 and the pressure control valve 25 cooperate together to comprise a variable pressure source indicated generally at 70. Various alternative configurations are contemplated for controlled pressure source of a hydraulic control system 10 constructed according to principles of the present disclosure. For example, the variable pressure source indicated generally at 70 in FIG. 1 that comprises the fixed displacement pump 15 and the pressure control valve 25 may be replaced by other components and assemblies to provide a controlled pressure source for the motor 11.

Figure 2:
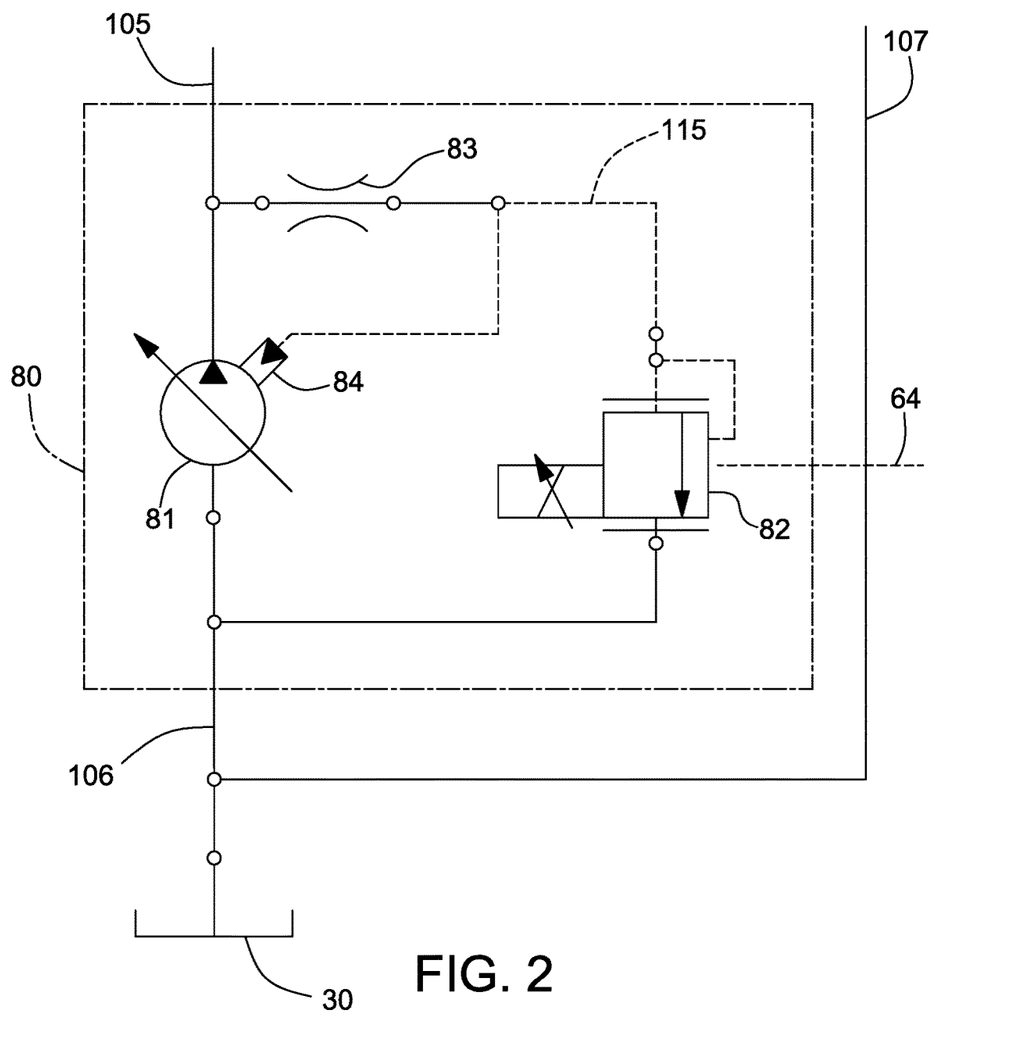
FIG. 2 is a schematic view of another embodiment of a variable pressure source for use with the hydraulic circuit of FIG. 1 in accordance with principles of the present disclosure.

Referring to FIG. 2, the variable pressure source 70 of FIG. 1 is replaced by a variable pressure source 80. In embodiments, the variable pressure source 80 comprises a variable displacement pump 81, a pressure pilot valve 82, and a flow orifice 83. In embodiments, the pump 81 can be any suitable pump that is acceptable for the intended application, as will be readily understood by one skilled in the art. The pump 81 includes a pilot control section 84 that operates to control the displacement of the pump.

In embodiments, the pressure pilot valve 82 can be any suitable valve that is acceptable for the intended application, as will be readily understood by one skilled in the art. In embodiments, the pressure pilot valve 82 can be an electro-proportional valve that controls the displacement of the pump 81 to also control the pressure in the valve supply line 105. The pilot pressure valve 82 can be adjusted to provide the desired hydraulic pressure to control the displacement of the pump 81. Adjustment of the output from the pilot pressure valve 82 can be adjusted by controlling the amount of current provided to the pressure pilot valve (such as, by way of the controller 61, for example). Control of the pilot pressure valve 82 by the closed-loop control system 35 can be similar to the control of the pressure control valve 25 as described above. Other configurations of the variable displacement pump 81 are contemplated as are other manners of controlling the displacement of the pump.

In embodiments, the flow orifice 83 can be any suitable flow orifice that is acceptable for the intended application, as will be readily understood by one skilled in the art. In embodiments, the flow orifice 83 operates to control the flow rate of hydraulic fluid between the valve supply line 105 and the pilot line 115 interconnecting the pilot pressure valve 82 and the pilot control section 84 of the pump 81.

Figure 3:
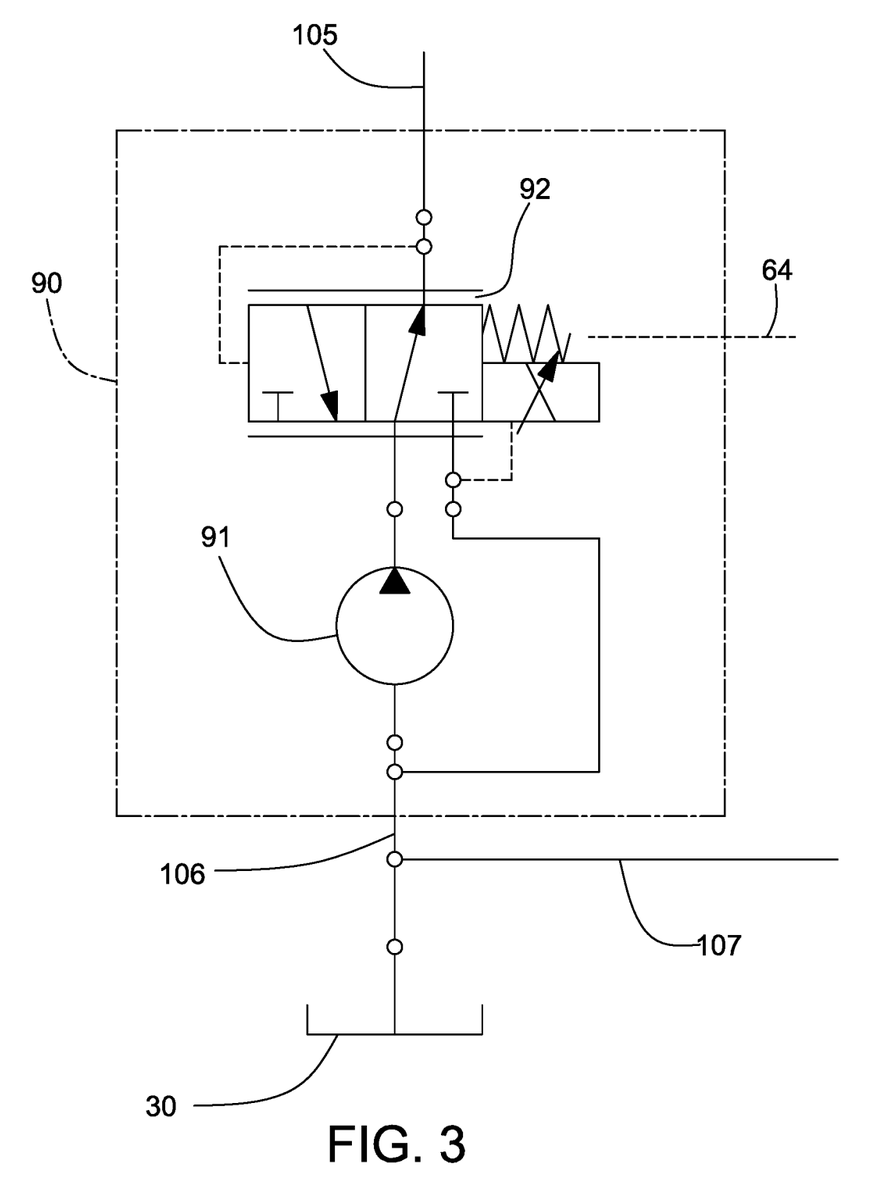
FIG. 3 is a schematic view of still another embodiment of a variable pressure source for use with the hydraulic circuit of FIG. 1 in accordance with principles of the present disclosure.

Referring to FIG. 3, the variable pressure source 70 of FIG. 1 is replaced by a variable pressure source 90. In embodiments, the variable pressure source 90 comprises a pump 91 and a valve 92. In embodiments, the pump 91 can be any suitable pump that is acceptable for the intended application, as will be readily understood by one skilled in the art. In embodiments, the pump 91 can be a fixed or variable displacement pump. In embodiments, the valve 92 can be any suitable valve that is acceptable for the intended application, as will be readily understood by one skilled in the art. In embodiments, the valve 92 can be a reducing/relieving valve that operates with the pump 91 to act as a variable pressure source. In embodiments, the valve 92 can be an electro-proportional valve that operates to control the output pressure in the valve supply line 105. The closed-loop control system 35 can control the valve 92 in a manner similar to the control of the pressure control valve 25 as described above.

Figure 4:
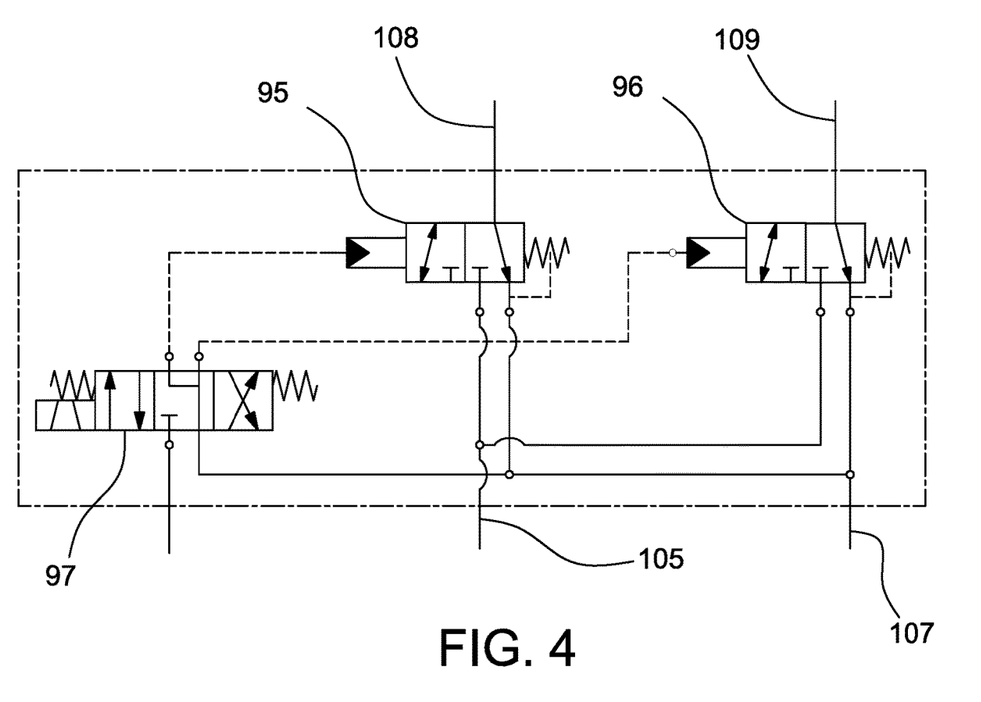
FIG. 4 is a schematic view of another embodiment of a reversing valve for use with the hydraulic circuit of FIG. 1 in accordance with principles of the present disclosure.

Referring back to FIG. 1, other forms of drive directing valves 20 are contemplated. For example, in an embodiment depicted in FIG. 4, a first two-way valve 95 can be positioned between the valve supply line 105 and the first motor line 108. A second two-way valve 96 can be positioned between the valve return line 107 and the second motor line 109. Each of the two-way valves 95, 96 can be controlled by a three-way pilot valve 97. Operation of the two-way valves 95, 96 will control the direction of operation of the motor 11. In another example that is not depicted, a three-way pilot valve may be operatively connected to the directional control valve 20 of FIG. 1 to control the operation thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hydraulic motor drive system, comprising:
    a tank, the tank adapted to hold a reservoir of hydraulic fluid,
    a variable pressure hydraulic fluid source, the variable pressure hydraulic fluid source in fluid communication with the tank, the variable pressure hydraulic fluid source adapted to receive a supply of hydraulic fluid from the tank and to discharge a flow of hydraulic fluid;
    a motor, the motor fluidly connected to the variable pressure hydraulic fluid source to be rotationally driven thereby;
    a rotatable member, the rotatable member arranged with the motor to be rotationally driven thereby;
    a sensor, the sensor operatively associated with at least one of the motor and the rotatable member, the sensor adapted to sense a rotational speed and to generate a speed signal indicative of the rotational speed of said at least one of the motor and the rotatable member sensed by the sensor; and
    a controller, the controller in operable communication with the sensor to receive the speed signal therefrom and with the variable pressure hydraulic fluid source, the controller configured to:
        determine an actual rotational speed of the at least one of the motor and the rotatable member based upon the speed signal received from the sensor,
        compare the actual rotational speed to a desired rotational speed, and
        if the actual rotational speed is greater than the desired rotational speed, send a control signal to the variable pressure hydraulic fluid source to reduce the pressure supplied by the variable pressure hydraulic fluid source.

2. The hydraulic motor drive system of claim 1, wherein the desired rotational speed comprises an upper speed limit and wherein the controller is further configured to:
    compare the actual rotational speed to a lower speed limit; and
    if the actual rotational speed is less than the lower speed limit, send a second control signal to the variable pressure hydraulic fluid source to increase the pressure supplied by the variable pressure hydraulic fluid source.

3. The hydraulic drive system of claim 2, wherein the upper speed limit and the lower speed limit are identical.

4. The hydraulic drive system of claim 2, wherein the upper speed limit and the lower speed limit are different.

5. The hydraulic drive system of claim 2, wherein the rotatable member comprises a combine reel.

6. The hydraulic motor drive system of claim 2, wherein the variable pressure hydraulic fluid source and the motor are fluidly connected in series.

7. The hydraulic motor drive system of claim 1, wherein the variable pressure hydraulic fluid source comprises a fixed displacement pump and a pressure control valve, the motor and the pressure control valve being fluidly connected in parallel.

8. The hydraulic motor drive system of claim 7, wherein the pressure control valve includes a valve inlet port and a valve outlet port, the pump includes a pump outlet port, and the tank including a tank inlet port, the pump outlet port and the valve inlet port being fluidly connected and the tank inlet port and the valve outlet port being fluidly connected.

9. The hydraulic motor drive system of claim 7, wherein the pressure control valve comprises an electro-proportional pressure control valve.

10. The hydraulic motor drive system of claim 1, wherein the variable pressure hydraulic fluid source comprises a variable displacement pump and a pressure pilot valve, the pressure pilot valve adapted to control a displacement of the variable displacement pump.

11. The hydraulic motor drive system of claim 10, further comprising a flow orifice, the flow orifice includes an orifice inlet port and an orifice outlet port, the pump includes a pump outlet port, and the tank including a tank inlet port, the pump outlet port and the orifice inlet port being fluidly connected and the tank inlet port and the orifice outlet port being fluidly connected through pressure pilot valve.

12. The hydraulic motor drive system of claim 11, wherein the variable displacement pump comprises a pilot control section adapted to control the displacement of the variable displacement pump and the orifice outlet port is fluidly connected to the pilot control section of the variable displacement pump.

13. The hydraulic motor drive system of claim 11, wherein the pressure pilot valve comprises an electro-proportional control valve.

14. The hydraulic motor drive system of claim 1, wherein the variable pressure hydraulic fluid source comprises a pump and a pressure relief valve, the pump and pressure relief valve being fluidly connected in series with the motor.

15. The hydraulic motor drive system of claim 1, further comprising a check valve fluidly connected in series with the variable pressure hydraulic fluid source and the motor, the check valve adapted to prevent flow from the variable pressure hydraulic fluid source to the motor if the flow from the variable pressure hydraulic fluid source is below a threshold pressure.

16. The hydraulic motor drive system of claim 1, wherein the motor further comprises a first port and a second port, and further comprising a directional control valve, the directional control valve being in fluid communication with the variable pressure hydraulic fluid source, the motor, and the tank, and the directional control valve adapted to selectively direct the flow of hydraulic fluid from the variable pressure hydraulic fluid source to one of the first port and the second port of the motor and direct return flow from another of the first port and the second port of the motor to the tank.

17. A method of operating a hydraulic motor drive system, comprising:
    rotating a rotatable member by directing a flow of hydraulic fluid from a variable pressure hydraulic fluid source to a motor operably connected to the rotatable member;
    sensing an actual rotational speed of at least one of the motor and the rotatable member using a sensor;
    comparing the actual rotational speed to a desired rotational speed; and
    if the actual rotational speed is greater than the desired rotational speed, reducing a pressure supplied by the variable pressure hydraulic fluid source to reduce the actual rotational speed of the at least one of the motor and the rotatable member.

18. The method of claim 17, wherein the desired rotational speed comprises an upper speed limit and further comprising:

comparing the actual rotational speed to a lower speed limit; and if the actual rotational speed is less than the lower speed limit, increasing the pressure supplied by the variable pressure hydraulic fluid source to increase the actual rotational speed of the at least one of the motor and the rotatable member.

19. The method of claim 18, wherein the upper speed limit and the lower speed limit are identical.

20. The method of claim 18, wherein the upper speed limit and the lower speed limit are different.

21. The method of claim 17, further comprising directing the flow of hydraulic fluid in series from the variable pressure hydraulic fluid source to the motor.

22. The method of claim 17, wherein the variable pressure hydraulic fluid source comprises a fixed displacement pump and a pressure control valve, and further comprising reducing a threshold pressure of the pressure control valve if the actual rotational speed is greater than the desired rotational speed.

23. The method of claim 22, further comprising directing hydraulic fluid through the pressure control valve in parallel to the pump.

24. The method of claim 17, wherein the variable pressure hydraulic fluid source comprises a variable displacement pump, and further comprising operating a pressure pilot valve to control a displacement of the variable displacement pump.

25. The method of claim 24, further comprising directing hydraulic fluid from the pump through a flow orifice, with a portion of the hydraulic fluid passing through the flow orifice directed through the pressure pilot valve and into the tank.

26. The method of claim 25, further comprising passing another portion of the hydraulic fluid passing through the flow orifice into a pilot control section of the variable displacement pump to control the displacement of the variable displacement pump.

* * * * *